(12) United States Patent
Buhrig et al.

(10) Patent No.: US 11,474,720 B1
(45) Date of Patent: Oct. 18, 2022

(54) SYSTEMS AND METHODS FOR IMPLEMENTING A CUSTOM HEAP MEMORY MANAGER TO OPTIMIZE COMPUTE KERNEL PERFORMANCE

(71) Applicant: Illuscio, Inc., Culver City, CA (US)

(72) Inventors: Daniel Buhrig, Berlin (DE); A Young Ryu, North York (CA)

(73) Assignee: Illuscio, Inc., Culver City, CA (US)

(*) Notice: Subject to any disclaimer, the term of this patent is extended or adjusted under 35 U.S.C. 154(b) by 0 days.

(21) Appl. No.: 17/712,587

(22) Filed: Apr. 4, 2022

(51) Int. Cl.
*G06F 3/06* (2006.01)

(52) U.S. Cl.
CPC ............ *G06F 3/0631* (2013.01); *G06F 3/064* (2013.01); *G06F 3/0604* (2013.01); *G06F 3/0673* (2013.01)

(58) Field of Classification Search
CPC ...... G06F 3/0631; G06F 3/0604; G06F 3/064; G06F 3/0673
See application file for complete search history.

(56) References Cited

U.S. PATENT DOCUMENTS

| | | | |
|---|---|---|---|
| 10,996,988 B2* | 5/2021 | Park | G06T 1/60 |
| 2004/0064671 A1* | 4/2004 | Patil | G06F 12/1081 |
| | | | 711/E12.067 |
| 2013/0166873 A1* | 6/2013 | Olszewski | G06F 12/023 |
| | | | 711/171 |
| 2020/0098082 A1* | 3/2020 | Gutierrez | G06F 9/30098 |
| 2020/0211264 A1* | 7/2020 | Janus | G06T 15/06 |
| 2020/0264970 A1* | 8/2020 | Lee | G06F 9/45558 |
| 2020/0364088 A1* | 11/2020 | Ashwathnarayan | G06F 9/5016 |
| 2021/0042964 A1* | 2/2021 | Yeung | G06N 3/088 |
| 2021/0166372 A1* | 6/2021 | Verschaeve | G06F 9/4843 |
| 2022/0108479 A1* | 4/2022 | Ray | H04N 19/597 |

* cited by examiner

*Primary Examiner* — Nanci N Wong
*Assistant Examiner* — Tong B. Vo
(74) *Attorney, Agent, or Firm* — Ansari Katiraei LLP; Arman Katiraei; Sadiq Ansari

(57) ABSTRACT

Disclosed is a heap memory manager that manages an entry and a removal of data from a single allocated block of memory. The heap memory manager may receive a set of nodes from a tree-based representation of a point cloud or another image, may allocate a single block of memory for processing and/or rendering the set of nodes, may assign each node of the set of nodes to an exclusive range of addresses within the single block of memory, and may upload data of each of the set of nodes to the single block of memory in the exclusive range of addresses assigned to each node. A controller may then invoke a compute kernel with one or more compute kernel instances processing an address range that is different than the exclusive range of addresses assigned to each node of the set of nodes.

20 Claims, 10 Drawing Sheets

SYSTEMS AND METHODS FOR IMPLEMENTING A CUSTOM HEAP MEMORY MANAGER TO OPTIMIZE COMPUTE KERNEL PERFORMANCE

BACKGROUND

Graphics processing units ("GPUs") may contain several processing cores for parallel task execution. While the initial use of GPUs focused on rendering graphical images, modern graphics application programming interfaces ("APIs") (e.g., Open Graphics Library ("OpenGL"), Vulkan, OpenCL, Metal, Compute Unified Device Architecture ("CUDA"), etc.) have opened the GPUs and their processing cores to other parallelized tasks including the parallelized execution of customized computation tasks.

The GPU processing cores require access to the GPU onboard memory in order to perform the customized computation tasks. For certain tasks (e.g., the rendering of large image files or point clouds), the GPU memory manager may become a point of inefficiency when a large number of memory allocations and deallocations are performed to load in and out the data for the customized computation tasks during each execution cycle or pass.

DETAILED DESCRIPTION OF PREFERRED EMBODIMENTS

Figure 1:
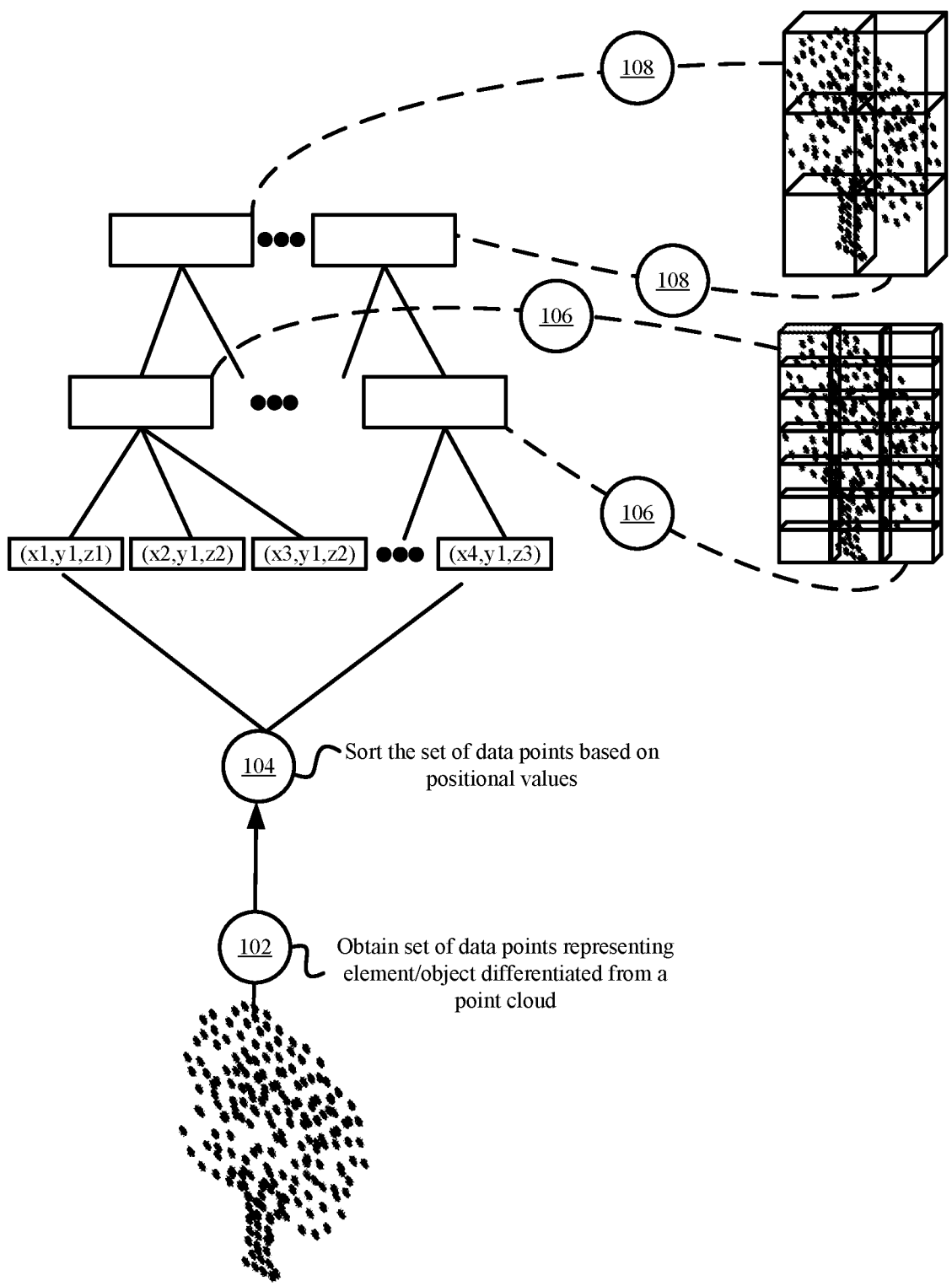
FIG. 1 illustrates a process for constructing a binary tree based on a scattered set of data points from a point cloud in accordance with some embodiments presented herein.

The following detailed description refers to the accompanying drawings. The same reference numbers in different drawings may identify the same or similar elements.

Provided are systems and methods for implementing a custom heap memory manager to optimize compute kernel performance. The custom heap manager may manage the allocation and deallocation (e.g., freeing) of memory used by the processing cores of a graphics processing unit ("GPU") and/or other processors.

In some embodiments, the custom heap manager may use a single memory allocation to allocate memory across multiple execution cycles or passes. Specifically, the custom heap manager may allocate a large block of memory from the GPU when the GPU is used to render a large image file or point cloud, and may dynamically assign nodes or data points of the point cloud that are within a changing render frustum to different address ranges within the allocated memory without allocating and/or deallocating memory from the GPU. In other words, the custom heap manager may upload the nodes or data points to different memory offsets within the allocated memory, may track usage of the allocated memory, and may overwrite specific memory offsets to change the nodes or data points that are processed and/or rendered by the compute kernels without calling the GPU memory allocate or deallocate functions. In this manner, the custom heap manager may optimize the processing or rendering of a point cloud on a GPU by eliminating all but one memory allocation, by reducing the data that is uploaded to the GPU memory between different execution cycles or passes, and/or by providing an equal amount of data or work for each compute kernel invocation.

A point cloud may include millions or billions of data points that are positioned within a three-dimensional ("3D") space, and that collectively generate a 3D image of a 3D environment and/or one or more 3D objects within the 3D environment. Each data point may capture the positioning and coloring of a different surface, feature, article, or object from the 3D environment at a corresponding point in the 3D space. Accordingly, each data point may include positional elements and non-positional elements.

The positional elements may include coordinates within the 3D space. For instance, each point cloud data point may include x-coordinate, y-coordinate, and z-coordinate elements to capture the position of an imaged surface, feature, article, or object from the 3D environment at a corresponding position in the 3D space.

The non-positional elements may include information about the detected characteristics of the surface, feature, article, or object imaged at a corresponding position in the 3D space. This may include visual and non-visual characteristics of the corresponding surface, feature, article, or object.

In some embodiments, the characteristics represented by the non-positional elements may correspond to a detected color. The color may be represented using red, green, blue ("RGB"), and/or other values. In some embodiments, the characteristics represented by the non-positional elements may provide the chrominance, translucency, reflectivity, and/or luminance of the imaged surface, feature, article, or object. In some embodiments, the characteristics may be related to properties of the device used to generate each of the data points. For instance, the characteristics may include a Tesla strength value to quantify the strength of the magnetic field that was used in detecting and/or imaging the surface, feature, article, or object represented by a particular point cloud data point. In some embodiments, the non-positional elements may include energy, audio or sound, and/or other characteristics of the device or the object being imaged. Accordingly, the non-positional elements can include any property of the imaged surface, feature, article, or object (e.g., hue, saturation, brightness, reflectivity, etc.), or of the device used to capture the object part at a corresponding data point in 3D space.

A tree-based structure may be used to efficiently represent and/or access the point cloud data points. Specifically, a tree-based representation of a point cloud may allow a point cloud editing, rendering, and/or processing system to quickly and efficiently access different subsets of data points that share specific commonality represented by different branches or parent nodes of the tree-based representation. In some embodiments, a point cloud may be represented using a binary tree, an octree, a k-d tree, or another tree.

In some embodiments, the tree may preserve the positional relationships between different sets of data points, the non-positional relationships between different sets of data points, and/or other commonality amongst the data points. For instance, a parent node in the tree may represent a 3D volume or region, and all child or leaf nodes grouped under that parent node may include or correspond to data points with positional data elements that are within the 3D volume or region of the parent node. Similarly, a parent node in the tree may represent a particular range of colors, and all child or leaf nodes grouped under that parent node may include or correspond to data points with non-positional data elements that specify coloring in the particular range of colors.

The tree may also represent the point cloud with different levels of detail. In some embodiments, the highest or greatest level of detail for representing the point cloud may be defined at the leaf node layer of the tree. Each leaf node may correspond to a different data point of the point cloud. A parent node may connect to two or more leaf nodes, and may be defined with a single set of positional and non-positional elements to represent the positional and non-positional elements of each of the two or more leaf nodes. Alternatively, a parent node may connect to a set of leaf nodes, and may be defined based on a subset of the set of leaf nodes. For instance, the parent node may include values from five of ten children nodes that are linked to that parent node to represent the children nodes with half of the data. Accordingly, a parent node may provide an approximate representation that is an average, combination, or other blending of the positional and non-positional values from each of its children nodes. In an octree representation of a point cloud, each parent node may be a substitute for eight children nodes, and may therefore represent the corresponding region or volume of 3D space with $\frac{1}{8}^{th}$ the detail as its children nodes.

In some embodiments, the point cloud may be encoded as a hierarchical space-partitioning data structures (e.g., octree, nested tree, Potree, etc.). These hierarchical formats may include a tree-based representation of the point cloud in which each node stores a subsample of the original point cloud. While the root node stores only a sparse set of points over a large volume, the size of a node may shrink and the point density may increase with each level. The data points may be distributed across the hierarchy levels according to one or more techniques. In these hierarchical formats, a full resolution rendering of the point cloud may include adding, merging, rendering, and/or otherwise processing all nodes from all hierarchy levels.

The custom heap memory manager described herein may be used to optimize the editing, rendering, and/or processing of point clouds and other large image files in a multiple of different formats and/or tree-based representation. Accordingly, the operation of the custom heap memory manager is not limited to any particular image file format.

FIG. 1 illustrates a process for constructing a binary tree based on a scattered set of data points from a point cloud in accordance with some embodiments presented herein. The process may include receiving or extracting (at 102) data points from a point cloud or other large image file. The data points may include several data points with a nonuniform or irregular positioning and different non-positional information (e.g., visual characteristics).

The process may include sorting (at 104) the data points according to their positional values. The process may include creating (at 106) a parent node for the data points falling within equally sized partitioned volumes or regions of 3D space that are of a first size. Creating (at 106) the parent node may include defining a single data point with positional and non-positional values that are derived based on the positional and non-positional values of the two or more data points located within the region of space represented by the parent node.

The process may determine if the root node has been reached. In response to determining that the root node has not been reached, the process may include generating (at 108) a next higher level of parent nodes by combining the positional and non-positional data values of a pair of children node. In other words, the process may generate a parent node based on two or more children nodes that fall within equally sized partitioned volumes or regions of 3D space that are of a larger second size, and therefore represent the point cloud with less detail than the nodes created to represent the point cloud with the volumes or regions of the smaller first size. In response to determining that the root node has been reached, the process may include outputting or storing the constructed tree for efficient accessing, rendering, editing, processing, and/or other interactions with the point cloud and/or the data points of the point cloud that are organized to that tree.

Rendering each and every data point of a point cloud or each leaf node may consume too many resources and require too much time. Accordingly, the point cloud may be rendered with different levels of detail at different regions of the 3D space by selectively rendering different nodes at different layers of the tree-based representation.

In some embodiments, a rendering system may determine the render frustum, may determine different levels of detail with which to render different regions of the render frustum, and may process and/or render nodes of the point cloud tree-based representation at the corresponding levels of detail. For instance, the rendering system may determine to render a center of the render frustum with a first level of detail and a periphery of the render frustum with a lower second level of detail, or may determine to render nodes or data points in a near plane of the render frustum with the first level of detail and nodes or data points in farther planes of the render frustum with progressively lesser levels of detail.

Figure 2:
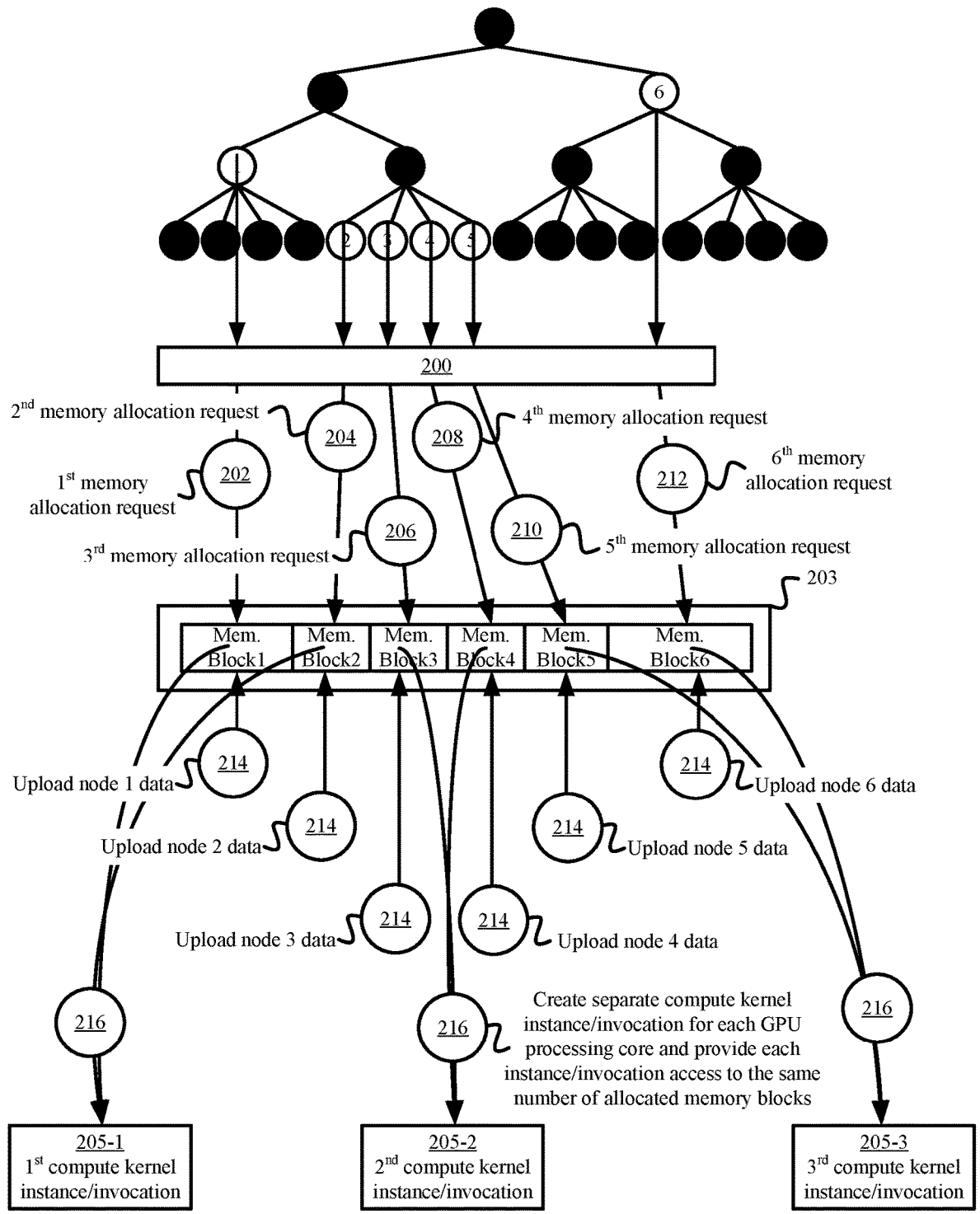
FIG. 2 illustrates operation of a standard heap manager in processing and/or rendering different nodes from a tree-based representation of a point cloud in accordance with some embodiments presented herein.

FIG. 2 illustrates operation of standard GPU heap manager 200 in processing and/or rendering different nodes from a tree-based representation of a point cloud in accordance with some embodiments presented herein. For each node of the tree-based representation that is to be processed and/or rendered, GPU heap manager 200 may issue (at 202, 204, 206, 208, 210, and 212) a memory allocation call to allocate memory for that node from GPU memory 203. If 1,000 nodes are selected, then the GPU heap manager may perform 1,000 memory allocations. Each memory allocation may consume a certain amount of time and resources.

GPU heap manager 200 may upload (at 214) the data associated with each node to the corresponding block of memory that was allocated for that node from GPU memory 203. In some cases, the selected nodes may contain or be associated with different amounts of data. For instance, a parent node may contain data for 10 data points, whereas a child node of that parent node may contain data for 25 data points. Accordingly, GPU heap manager 200 may allocate different amounts of memory for different nodes, and may upload different amounts of data to each allocated memory block.

Multiple processing cores of the GPU may then be used to process and/or render the nodes that have been uploaded to GPU memory 203 in a highly parallelized manner. A controller may define a compute kernel to distribute the workload associated with rendering and/or processing the node data that is uploaded to GPU memory 203 across the GPU processing cores. The compute kernel may correspond to a compute function (e.g., a compute shader) that executes in a highly parallel environment using the GPU processing cores over a large dataset (e.g., the node data that is uploaded to GPU memory 203). Specifically, invoking the compute kernel may include creating (at 216) a separate instance or invocation of the compute kernel 205-1, 205-2, and 205-3 (sometimes herein collectively referred to as "compute kernel instances 205" or individually as "compute kernel instance 205") for each GPU processing core, and providing each compute kernel instance 205-1, 205-2, and 205-3 access to the same number or a similar number of allocated memory blocks. In this manner, the compute kernel instances may be exploited to produce an image projection of the point cloud by computing a RGB value and/or performing other custom defined computations for each pixel of the produced image.

Accordingly, during a particular compute kernel execution cycle or pass, compute kernel instances 205 may process and/or render the data in the assigned memory blocks. Since the assigned memory blocks may contain different amounts of data, some compute kernel instances 205 and their corresponding GPU processing cores may complete execution before other compute kernel instances 205 and their corresponding GPU processing cores, thereby resulting in an unequal amount of work being performed by compute kernel instances 205 despite the compute kernel invocation assigning an equal number of nodes for each compute kernel instance 205 to process and/or render during the execution cycle or pass.

GPU heap manager 200 may deallocate (e.g., free or remove from GPU memory 203) the memory allocations after the execution cycle or pass is complete, and may perform the memory allocations anew for nodes that are to be processed and/or rendered as part of a next image or frame. Alternatively, GPU heap manager 200 may deallocate memory blocks for nodes from the last rendered image or frame that are not rendered in the next image or frame, and may allocate memory blocks for new nodes that were not rendered in the last rendered image or frame and that are part of the next image or frame. In any case, GPU heap manager 200 may perform a separate memory allocation for each node, and the allocations may be of different sizes based on different amounts of data associated with each node.

Figure 3:
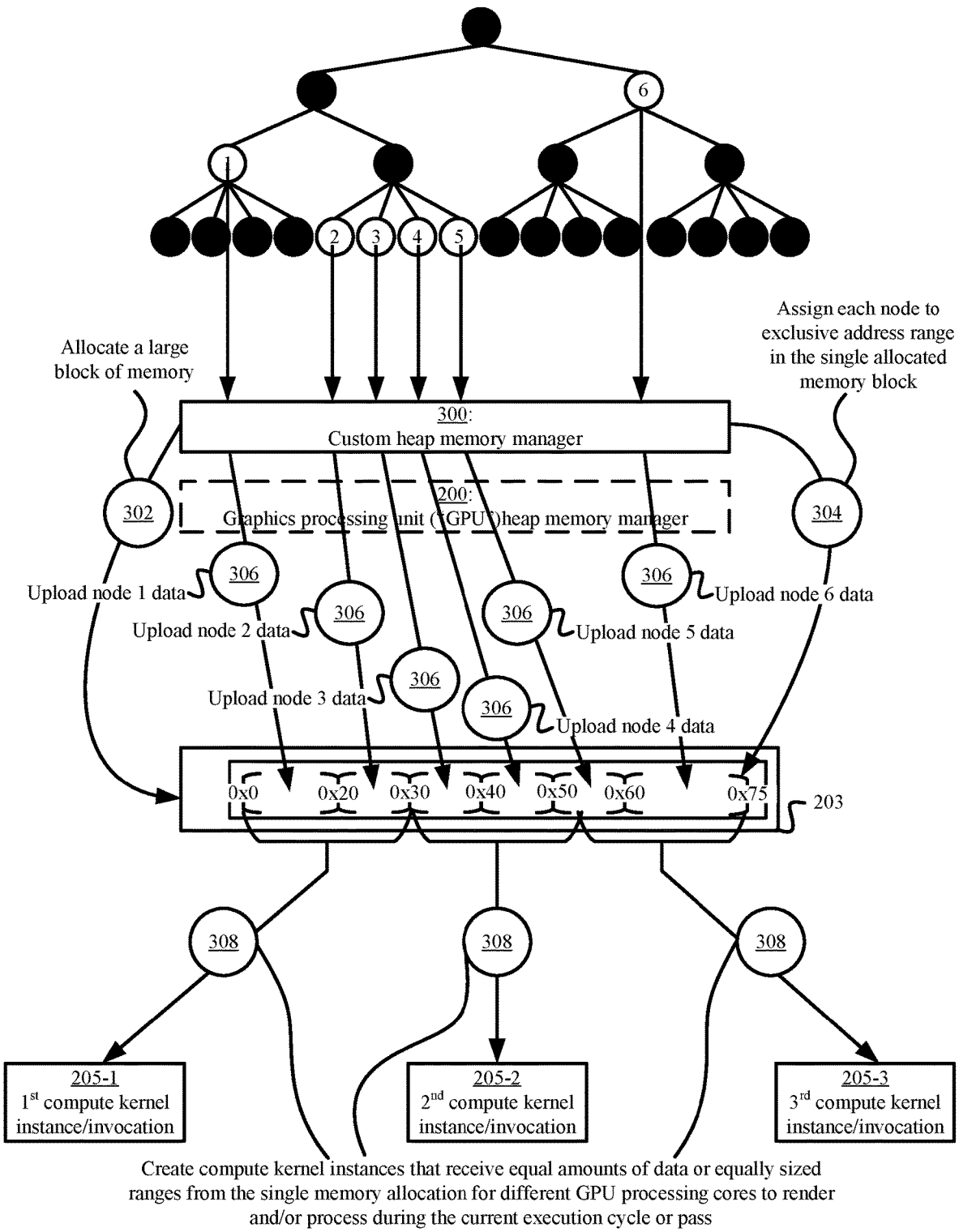
FIG. 3 illustrates operation of a custom heap manager for efficiently processing and/or rendering different nodes from a tree-based representation of a point cloud using a single memory allocation in accordance with some embodiments presented herein.

FIG. 3 illustrates operation of custom heap manager 300 for efficiently processing and/or rendering different nodes from a tree-based representation of a point cloud using a single memory allocation in accordance with some embodiments presented herein. Custom heap manager 300 may override, replace, or take over GPU memory 203 management from GPU heap manager 200.

As shown in FIG. 3, custom heap manager 300 may perform (at 302) a single memory allocation to acquire a large block of GPU memory 203 irrespective of the nodes and/or data points that are to be processed and/or rendered during any given execution cycle or pass. Accordingly, custom heap manager 300, unlike GPU heap manager 200, does not allocate separate memory for each node and/or data point.

Custom heap manager 300 may assign (at 304) exclusive memory offsets or addresses from the single memory allocation to different nodes. Custom heap manager 300 may upload (at 306) the data from the nodes to the assigned memory offsets or addresses. In this manner, custom heap manager 300 may partition the single allocated block of memory into virtual subblocks by using different ranges or addressing within the single allocated block of memory to store the data of different nodes selected for processing and/or rendering during the current execution cycle or pass.

A compute kernel may be defined to span the address range within the single allocated block of memory for the uploaded node data that is to be rendered and/or processed during the current execution cycle or pass. Invoking the compute kernel may include creating (at 308) compute kernel instances 205 that receive equal amounts of data or equally sized ranges from the single memory allocation for different GPU processing cores to render and/or process during the current execution cycle or pass. In other words, each compute kernel instance 205 may receive access to a different range of addresses than the exclusive memory offsets or addresses that were assigned to different nodes.

In this manner, the virtual subblock allocation of the single memory block performed by custom heap manager 300 provides a more flexible and equal distribution of work to the GPU processing cores than the allocation of different fixed sized memory block performed by GPU heap manager 200. Consequently, the GPU processing cores may execute for an equal duration during a given execution cycle or pass, and the collective set of GPU processing cores may complete the processing and/or rendering of all selected nodes in less time when compute kernel instances 205 receive equal sized address ranges from the single memory block managed by custom heap manager 300 than when compute kernel instances 205 receive equal numbers of memory blocks containing different amounts of data that GPU heap manager 300 allocates for nodes defined with different levels of detail.

Custom heap manager 300 may retain the memory allocation when rendering subsequent images or frames for the same point cloud using different nodes from the tree-based representation. For instance, rather than deallocate memory for a first node, that is rendered in a first frame and not a second frame, and allocate memory for a second node, that is not rendered in the first frame and is rendered in the second frame, custom heap manager 300 may mark the memory offsets where the data for the first node is stored as being free or unused, may assign the second node to the memory offsets that are marked as free or unused, and may upload the data of the second node to the assigned memory offsets thereby overwriting and replacing the data of the first node without performing any memory allocation or deallocation operations.

In some embodiments, marking the memory offsets where the data for the first node is stored may not involve erasing, overwriting, or changing any of the data stored within those memory offsets. The data may be overwritten when custom heap manager 300 assigns those memory offsets to a new node, and uploads the data associated with the new node to the memory offsets. This may result in stale data being passed to one or more compute kernel instances 205 that process and/or render data for nodes that are not in the render frustum (e.g., part of the rendered image). However, there may be no performance penalty as an idle GPU processing core and a GPU processing core rendering and/or processing stale data have no affect on the performance of other GPU processing cores. In fact, there may be a performance advantage associated with not having to deallocate or free a corresponding block of memory with the memory offsets after every execution cycle or pass.

Figure 4A:
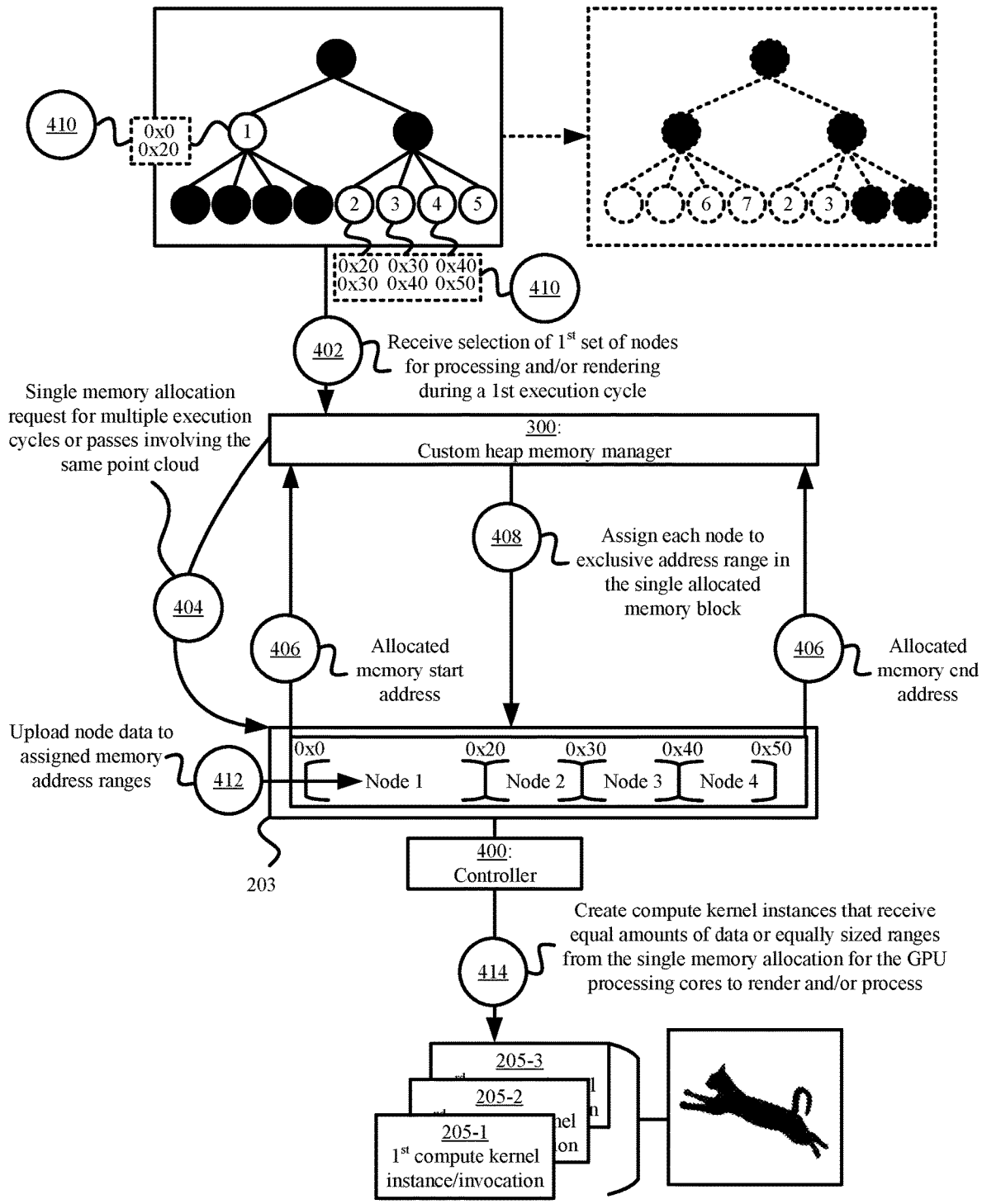
FIGS. 4A and 4B illustrate example operation of the custom heap manager managing a single allocation of memory for access by multiple processing cores over two execution cycles or passes in accordance with some embodiments presented herein.
Figure 4B:
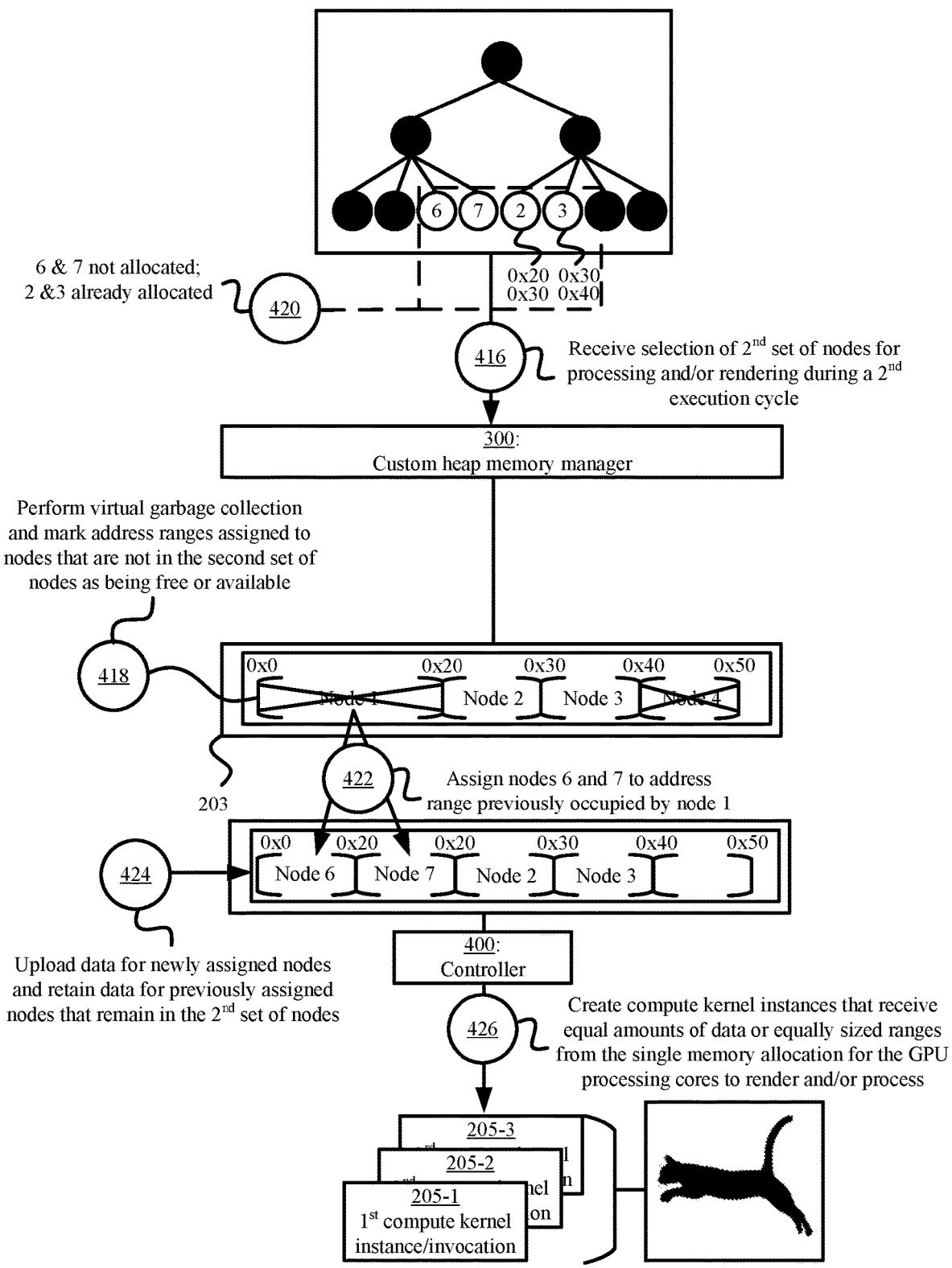

FIGS. 4A and 4B illustrate example operation of custom heap manager 300 managing a single allocation of memory for access by multiple compute kernel instances 205 over two execution cycles or passes in accordance with some embodiments presented herein. As shown in FIG. 4A, custom heap manager 300 may receive (at 402) a first set of nodes from a tree-based representation of a point cloud to process and/or render in order to create a first visualization of the point cloud.

The first set of nodes may represent data points in a region or volume of the point cloud at different levels of detail. In other words, some of the nodes from the first set of nodes may correspond to individual data points in the region or volume, while other nodes from the first set of nodes may correspond to values that are combined or derived from multiple data points. In some embodiments, the first set of nodes may be sorted based on rendering priority. For instance, the nodes providing the most amount of detail, at the center of the image, in the foreground, and/or representing other prioritized sections of the image may be arranged first so that they are processed first and provided first access to the allocated memory.

Custom heap manager 300 may allocate (at 404) a single large block of memory that may be accessed by compute kernel instances 205. For instance, custom heap manager 300 may allocate 90% of the total GPU memory 203 and/or the total memory that is accessible by compute kernel instances 205.

In some embodiments, custom heap manager 300 may allocate (at 404) a fixed amount of memory for different point clouds. In some other embodiments, custom heap manager may allocate (at 404) different amounts of memory based on various parameters such as the size of each point cloud and/or a configurable amount of data that each compute kernel instance 205 is to process and/or render during each execution cycle or pass.

In response to the memory allocation, custom heap manager 300 may receive (at 406) a start address and an end address for the GPU memory that is allocated to custom heap manager 300. Custom heap manager 300 may then assign (at 408) exclusive and non-conflicting address ranges or offsets from the allocated memory to each node in the ordered and/or sorted first set of nodes. Specifically, custom heap manager 300 may assign (at 408) a range of memory addresses that spans memory in the amount equal to the amount of data contained by the node being assigned to that range of memory addresses. Accordingly, some nodes may be assigned a larger range of addresses than other nodes. As shown in FIG. 4A, custom heap manager 300 may assign (at 408) the nodes with the least level of detail and/or closest to the root node of the tree before assigning (at 408) nodes with increasing level of detail and/or that are gradually further from the root node After each node-to-address range assignment (at 408), custom heap manager 300 may update the free and assigned regions of the allocated memory, and may track (at 410) which nodes from the tree-based representation have been assigned to which range of addresses from the allocated memory. In some embodiments, tracking (at 410) the assignments may include appending and/or adding an assigned address range to the node or the data structure that represents the node in the tree-based representation. In some other embodiments, tracking (at 410) the assignments may include generating a table that maps each assigned node to the memory address range assigned for that node.

Custom heap manager 300 may continue assigning (at 408) the selected nodes to the unassigned or free regions of the allocated memory until all nodes for a particular image or frame (e.g., the first set of nodes) are in the memory, or until the memory is fully assigned with nodes for the particular image or frame. In some embodiments, the amount of detail selected for the particular image or frame may exceed the amount of allocated memory. In some such embodiments, some nodes may be excluded and not processed and/or rendered as part of the particular image or frame. For instance, as shown in FIG. 4, the last leaf node (e.g., node 5) is excluded from the processing and/or rendering execution cycle and/or pass as the other nodes from the first set of nodes have consumed all the available and/or allocated memory. To minimize the impact on the particular image or frame, the selected nodes may be sorted so that the nodes that do not fit in the memory and that are at the end of the sorted order relate to data points in the periphery, background, out-of-focus regions, represent the smallest region of space, and/or that are otherwise determined to be of less importance to the particular image or frame than other data points of earlier sorted nodes.

Custom heap manager 300 may upload (at 412) the data associated with the nodes to the assigned memory addresses of the allocated memory. In some embodiments, custom heap manager 300 may upload (at 412) the data for each node after each node is assigned (at 408) a memory address range. In some other embodiments, custom heap manager 300 may upload (at 408) the data for all assigned nodes once the assignments (at 408) are complete or the memory is filled.

Custom heap manager 300 may upload (at 412) the data to the allocated GPU memory using function calls specified within the GPU drivers or a graphics library (e.g., Open Graphics Library ("OpenGL")). The uploading (at 412) may include writing or overwriting GPU memory 203 in the specified address range with data that is stored off the GPU in system memory, application memory, and/or storage.

Custom heap manager 300 may notify controller 400 when the memory upload is complete, or controller 400 may monitor operation of custom heap manager 300 and/or allocated memory 203 to invoke (at 414) a compute kernel that is defined for the entirety of the allocated GPU memory (e.g., from the start address to the end address of the allocated GPU memory). Controller 400 may include a scheduler and/or other process of the GPU that is tasked with the distribution of workload across the GPU processing cores. Invoking (at 414) the compute kernel may include creating compute kernel instances 205 for each available GPU processing core, and providing each compute kernel instance 205 access to an equally sized non-overlapping range of memory addresses from the allocated GPU memory.

In some embodiments, controller 400 may invoke a command, instruction, or function call that causes all compute kernel instances 205 to process and/or render an equal sized and non-conflicting subblock or region of the allocated memory. For instance, the allocated GPU memory may be 1 gigabyte in size and the GPU may have 100 processing cores, then each processing core may be tasked with processing and/or rendering a different 10 megabyte block of the memory associated with a different compute kernel instance 205. Executing compute kernel instances 205 with the GPU processing cores may generate a first image or frame based on the data of the first set of nodes that were uploaded into the single allocated memory block.

As shown in FIG. 4B, custom heap manager 300 may receive (at 416) a second set of nodes from the tree-based representation that are selected for a second image or frame of the point cloud. For instance, the point cloud may represent a 3D environment, and a user may move the position of a virtual camera within the 3D environment to change the data points and/or nodes of the tree-based representation that fall within the render frustum. The second set of nodes may include some of the same nodes as the first set of nodes and some new nodes that were not previously rendered, or may include nodes for representing a same region with more or less detail. Once again, the second set of nodes may be sorted based on rendering criteria before passing to custom heap manager 300.

Custom heap manager 300 may perform (at 418) a virtual garbage collection. The virtual garbage collection may include determining which nodes were assigned to the allocated memory from the previous execution cycle or pass and are not included in the second set of nodes for the current execution cycle or pass. In some embodiments, the virtual garbage collection may include scanning the tree-based representation to identify which nodes are appended with an address range of the allocated memory and are not included as part of the second set of nodes. The virtual garbage collection may include removing the assignment of one or more nodes, that were part of the first set of nodes and not the second set of nodes, to the addresses, address offsets, and/or address ranges in the allocated memory containing the data of the one or more nodes. Removing the assignment may involve marking the corresponding addresses, address offsets, and/or address ranges as being available or free. The virtual garbage collection does not involve issuing any memory deallocation or free commands to the GPU, zeroing out, or erasing the corresponding addresses, address offsets, and/or address ranges. In other words, the virtual garbage collection may be performed without calling the allocated GPU memory or altering the allocated GPU memory state.

In some embodiments, custom heap manager 300 may track the free and occupied areas in the memory by storing ranges corresponding to the start and end offsets of the free and occupied areas. When two consecutive ranges have the same state (e.g., free or occupied), custom heap manager 300 may merge the two consecutive ranges into one consecutive range.

Custom heap manager 300 may select a next node from the second set of nodes. Custom heap manager 300 may determine (at 420) whether the next node is already assigned to the allocated memory based on the next node being associated with an address range of the allocated memory. In response to the next node having been previously assigned to the allocated memory, custom heap manager 300 may make no changes to the memory assignments in order to retain the data that was previously uploaded to the assigned address range of the allocated memory. In response to the next node not being previously assigned to the allocated memory, custom heap manager 300 may identify an unassigned range of memory that is equal to or greater in size than the data associated with the next node, may assign (at 422) the next node to an identified available address range, and may upload (at 424) the data for that node into the assigned address range of the allocated memory. Custom heap manager 300 may continue selecting the next node in the second set of nodes until all nodes for the second image or frame are in the memory, or until the memory is fully assigned with nodes for the second image or frame.

Controller 400 may invoke (at 426) the compute kernel based on signaling from custom heap manager 300 and/or monitoring operations of custom heap manager 300. Invoking (at 426) the compute kernel may cause the GPU processing cores to generate a next or second image or frame based on the data of the second set of nodes that were uploaded into the same single allocated memory block and equally distributed amongst compute kernel instances 205 executed by the GPU processing cores. Custom heap manager 300 may continue using the single allocation memory, and may continue to overwrite only the address ranges that are reassigned from one node to another when rendering different images or frames of a point cloud or other animation.

Figure 5:
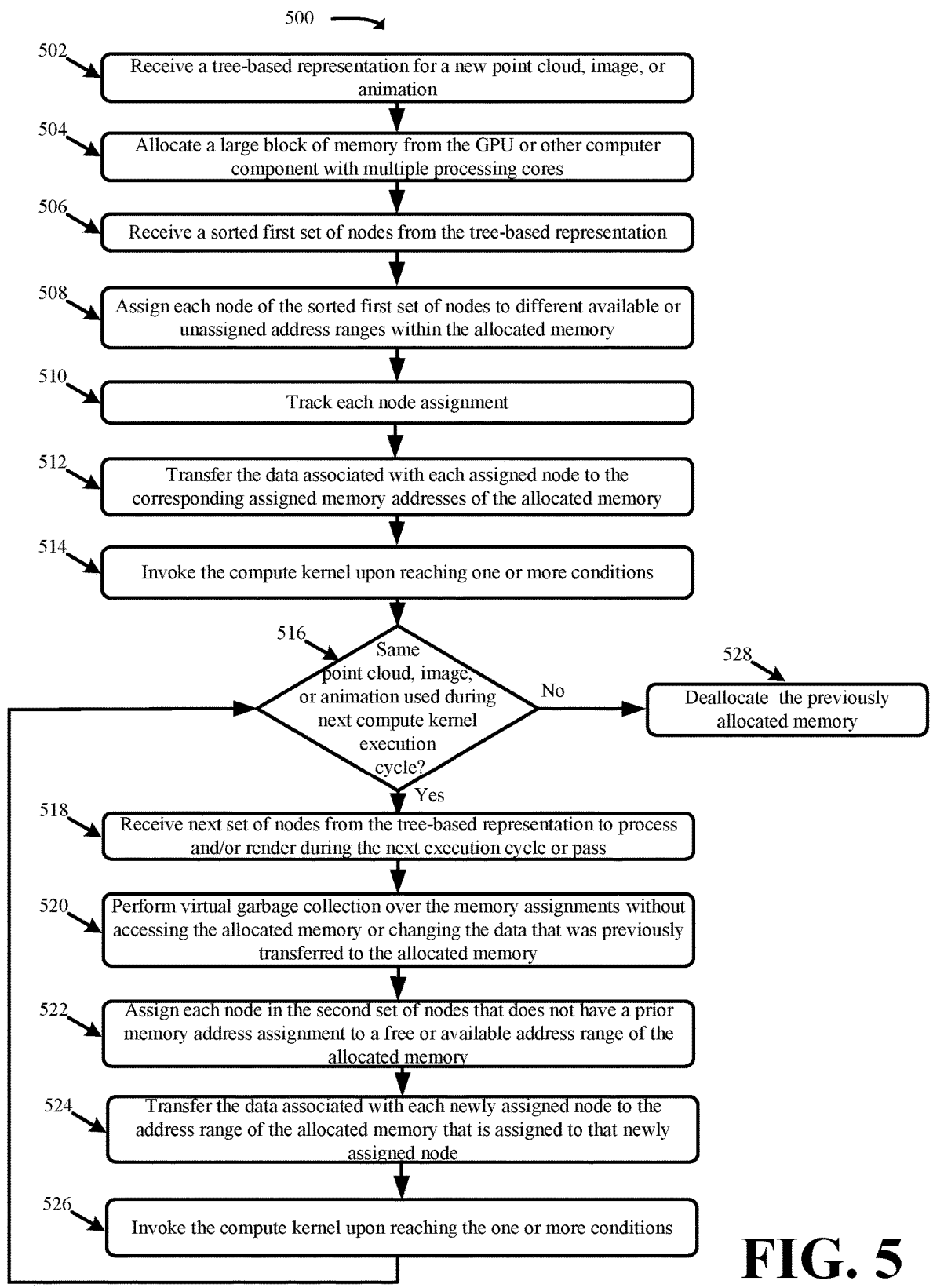
FIG. 5 presents a process for optimizing compute kernel and/or graphics processing unit ("GPU") processing core performance via a managed single allocation of memory in accordance with some embodiments presented herein.

FIG. 5 presents a process 500 for optimizing compute kernel and/or GPU processing core performance via a managed single allocation of memory in accordance with some embodiments presented herein. Process 500 may be implemented by custom heap manager 300 in conjunction with controller 400.

Process 500 may include receiving (at 502) a tree-based representation for a new point cloud, image, or animation. For instance, an application may issue a call to custom heap manager 300 when opening, accessing, and/or otherwise working with the new point cloud, image, or animation. The tree-based representation may correspond to a binary tree, an octree, a k-d tree, or another tree format that stores the point cloud, image, or animation data at different levels of detail and/or at the different layers of the tree.

Process 500 may include allocating (at 504) a large block of memory from the GPU or other computer component with multiple processing cores that support compute kernel instances and/or that may be used to accelerate and/or parallelize the processing and/or rendering of the new point cloud, image, or animation. In some embodiments, allocating (at 504) the large block of memory may include allocating a fixed percentage or amount of the Dual In-line Memory Modules ("DIMMs"), Random Access Memory ("RAM") modules, and/or other physical memory modules that the processing cores access during execution. In some other embodiments, allocating (at 504) the large block of memory may include determining a maximum amount of memory that may be needed to process and/or render each image or frame of the point cloud, image, or animation, and dynamically adjusting the amount of allocated memory in accordance with the determined maximum amount of memory. Allocating (at 504) the large block of memory may include issuing a memory allocation function call from custom heap manager 300 to the GPU for a specified amount of memory. In response to the memory allocation function call, custom heap manager 300 may receive a start address and an end address for the memory that has been allocated.

Process 500 may include receiving (at 506) a sorted first set of nodes from the tree-based representation. The sorted first set of nodes may represent a subset of nodes from the tree-based representation that is to be processed and/or rendered during a next execution cycle or render pass of the compute kernel.

The frequency with which the compute kernel executes and/or the processing cores operate may be determined by the application that processes and/or renders the point cloud, the operating system ("OS"), or the graphics subsystem of the device. For instance, the OS or graphics subsystem may have a fixed screen refresh rate of 60 hertz, and may therefore specify a rate of 60 execution cycles or passes every second for the compute kernel and/or processing cores. The application may sort the first set of nodes based on rendering priority so that nodes with important or prioritized visual information are rendered first.

Process 500 may include assigning (at 508) each node of the sorted first set of nodes to different available or unassigned address ranges within the allocated memory. Assigning (at 508) a node may include reserving an address range within the allocated memory that is large enough or equal in size to the data contained by that node. For example, a first node may contain 100 bytes of data, and a second node may contain 500 bytes of data. In this example, custom heap manager 300 may assign (at 508) a first range of addresses that spans 100 bytes of the allocated memory to the first node, and may assign (at 508) a second range of addresses that spans 500 bytes of the allocated memory to the second node. In some embodiments, custom heap manager 300 may assign (at 508) the data from each node to a single continuous range of addresses or a single subblock of the allocated memory.

Process 500 may include tracking (at 510) each node assignment. In some embodiments, tracking (at 510) the node assignments may include updating a table that tracks the assigned and free memory addresses of the allocated memory, and that maps the assigned nodes to the assigned address ranges. In some embodiments, tracking (at 510) the node assignments may include updating the assigned nodes in the tree-based representation to include the memory address range assigned to that node or to include a pointer to the entry within the table tracking the node assignment. In other words, custom heap manager 300 may add the assigned memory address information to the nodes of the tree-based representation. The assigned memory address information for an assigned node may therefore be stored alongside the positional and non-positional elements of that assigned node.

Process 500 may include transferring (at 512) the data associated with each assigned node to the corresponding assigned memory addresses of the allocated memory. In some embodiments, custom heap manager 300 may transfer (at 512) the node data after each assignment (at 508). Transferring (at 512) the data may include writing, uploading, or otherwise moving the data from a first memory or a first storage to the assigned memory address within the second memory that is accessible by the compute kernel. Accordingly, the first memory may include system RAM used by an OS or applications of a computer system, and the second memory may include the RAM on a GPU card that is connected to the computer system via a Peripheral Component Interconnect Express ("PCIe") bus or another communication bus.

Process 500 may include invoking (at 514) the compute kernel upon reaching one or more conditions. For instance, controller 400 may invoke (at 514) the compute kernel once all nodes of the first set of nodes have received a memory assignment and are transferred to the corresponding range of the allocated memory, the allocated memory is fully assigned and/or has no free space to accommodate data of another node, and/or the time allotted for the current execution cycle or pass is reached.

Invoking (at 514) the compute kernel may include configuring the compute kernel instances to perform a common set of processing and/or rendering operations over an exclusive and equally sized subblock or range of the allocated memory. In other words, invoking (at 514) the compute kernel may include providing an equal amount of work and/or data from the allocated memory for each compute kernel instance to process using a different processing core of the GPU.

Process 500 may include determining (at 516) if the same point cloud, image, or animation is to be processed and/or rendered during a next execution cycle or pass of the compute kernel. The same point cloud, image, or animation may be processed and/or rendered during the next execution cycle or pass when the application provides a second set of nodes from the same tree-based representation for the next execution cycle or pass, or when the same point cloud, image, or animation retains screen focus.

In response to determining (at 516—Yes) that the same point cloud, image, or animation is to be processed and/or rendered during the next execution cycle or pass, process 500 may include receiving (at 518) a next set of nodes from the tree-based representation to process and/or render during the next execution cycle or pass. Custom heap manager 300 may have tracked (at 510) which nodes in the second set of nodes were part of the nodes assigned to the allocated memory in the last execution cycle or pass, and which nodes in the second set of nodes are new nodes that were not assigned to the allocated memory in the last execution cycle or pass.

Process 500 may include performing (at 520) the virtual garbage collection over the memory assignments without accessing the allocated memory or changing the data that was previously transferred to the allocated memory. Performing (at 520) the virtual garbage collection may include reassigning any memory address ranges that were assigned to nodes that are not included as part of the second set of nodes as free or available address ranges, and/or removing the memory addresses from those nodes in the tree-based representation.

Process 500 may include assigning (at 522) each node in the second set of nodes that does not have a prior memory address assignment to a free or available address range of the allocated memory, and transferring (at 524) the data associated with each newly assigned node to the address range of the allocated memory that is assigned to that newly assigned node. Accordingly, after the initial execution cycle or pass for a particular point cloud, image, or animation, custom heap manager 300 may perform fewer memory transfers by overwriting the memory addresses that have been reassigned during the current execution cycle or pass rather than transferring all data for all assigned nodes to the allocated memory with each execution cycle or pass. In other words, the nodes that are processed and/or rendered over consecutive execution cycles or passes are assigned memory addresses and are uploaded to the assigned memory addresses once, and the uploaded memory is retained and reused during subsequent execution cycles or passes.

Process 500 may include invoking (at 526) the compute kernel upon reaching the one or more conditions, and determining (at 516) if the same point cloud, image, or animation is to be processed and/or rendered during a next execution cycle or pass of the compute kernel. In response to determining (at 516—No) that the same point cloud, image, or animation is not to be processed and/or rendered during the next execution cycle or pass, process 500 may include calling the free memory function to deallocate (at 528) the previously allocated memory so that the memory is made available to other applications and/or for other processing and/or rendering other point clouds, images, or animations.

Figure 6:
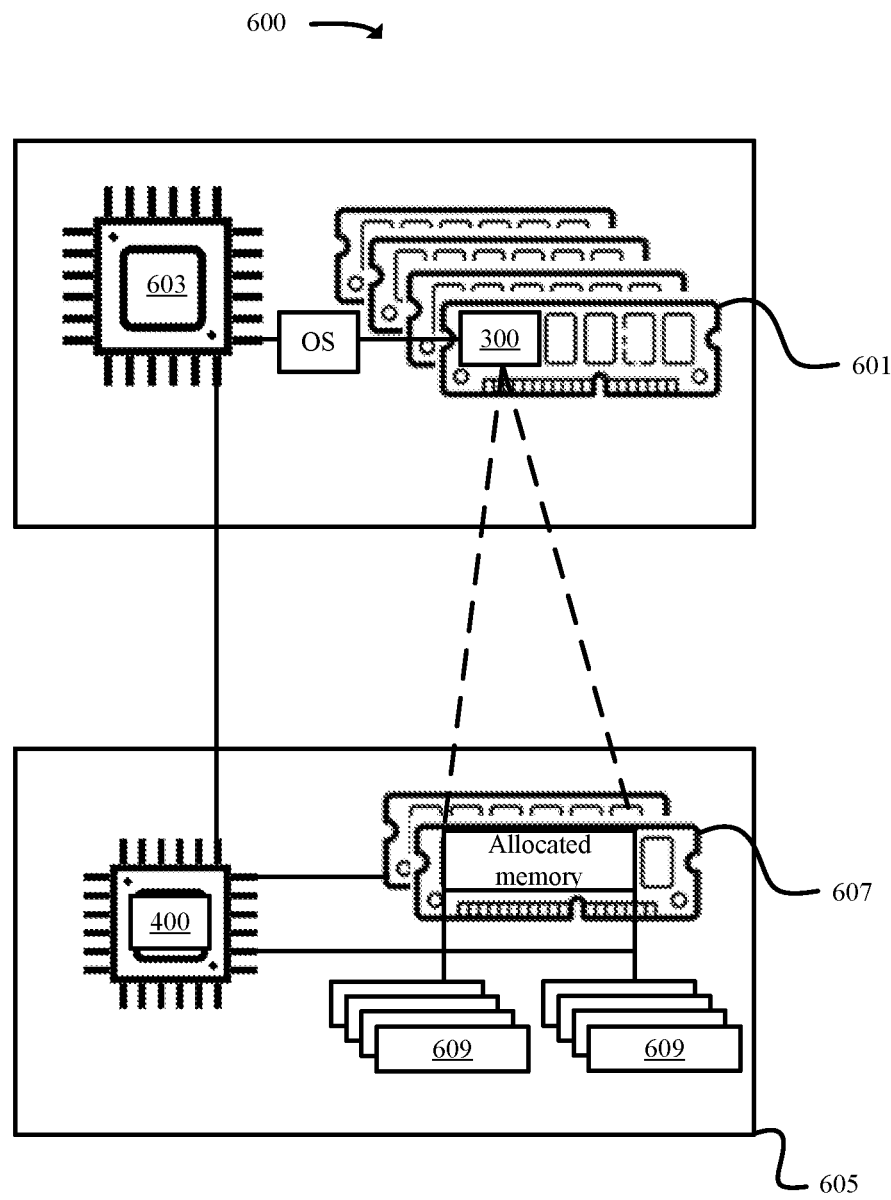
FIG. 6 presents an example architecture for the custom heap manager in accordance with some embodiments presented herein.

FIG. 6 presents example architecture 600 for custom heap manager 300 in accordance with some embodiments presented herein. Example architecture 600 may include system memory 601, processor 603, and GPU 605 with its own GPU memory 607 and processing cores 609. System memory 601 and GPU memory 607 may correspond to different forms of RAM or volatile memory. System memory 601 and GPU memory 607 may have different capacities and performance.

System memory 601 may be used by processor 603 for retaining OS data and/or different applications running on the computer system managed by the OS. Custom heap manager 300 may run within system memory 601 via execution of processor 603. Custom heap manager 300 may override or replace operation of the heap manager of GPU 605 by receiving an allocation of GPU memory 607 and by directly managing the data that is transferred and/or erased from the allocation.

Custom heap manager 300 may optimize the virtual garbage collection to prioritize the reassigning of memory addresses and/or the nodes that are removed from the allocated memory. In some embodiments, custom heap manager 300 may prioritize retaining the memory address assignments for nodes that were processed and/or rendered in a most recent execution cycle or pass, and freeing the memory address assignments for nodes that were last processed and/or rendered in a most distant execution cycle or pass. In doing so, custom heap manager 300 may continue to cache the nodes from the most recent execution cycles or passes in the allocated memory so that if the render frustum was to move back and reinclude those nodes, the data for those nodes will already reside in the allocated memory and no assignments and/or transfers will be needed.

Figure 7:
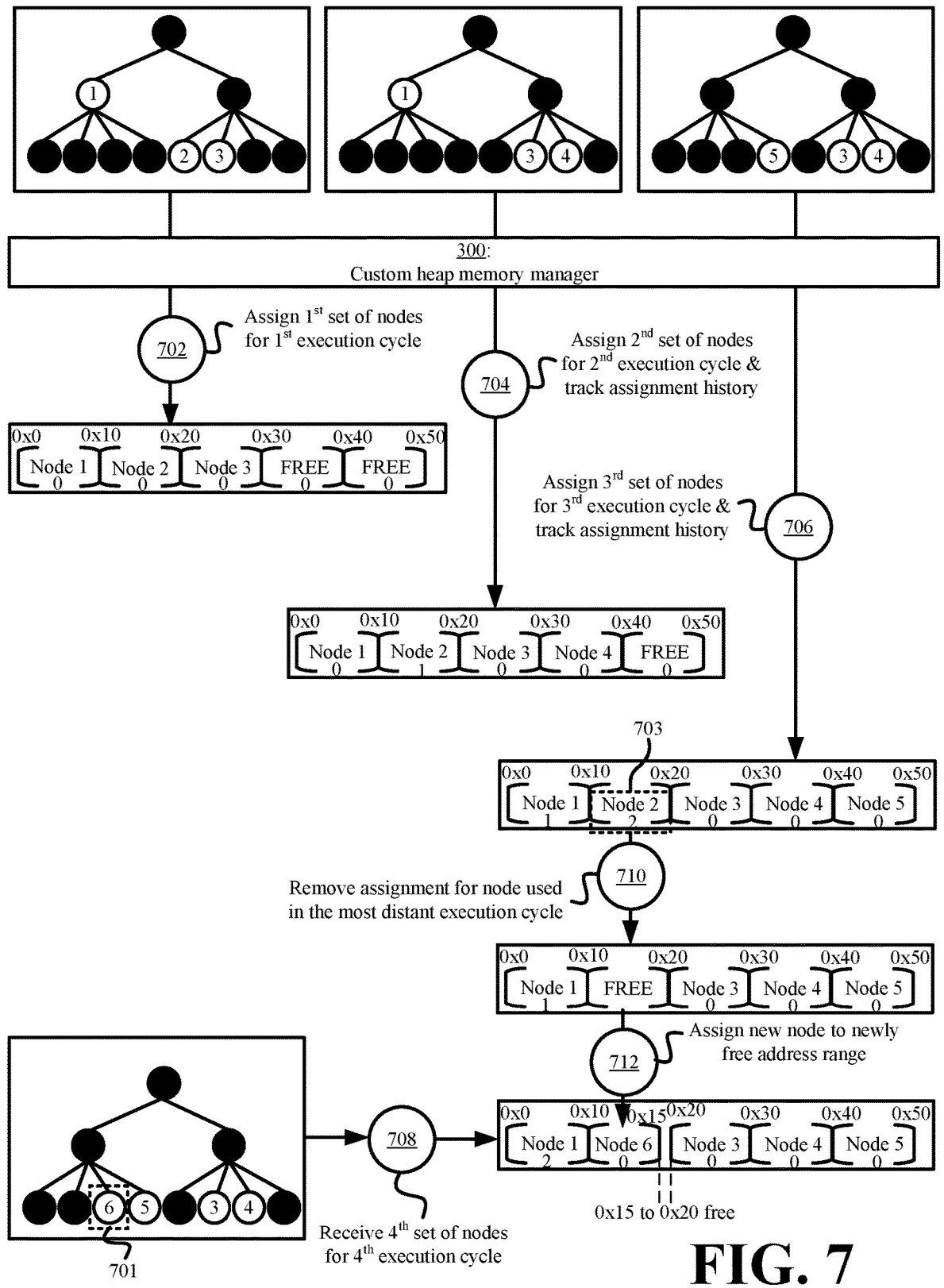
FIG. 7 illustrates an example of optimizing the virtual garbage collection in accordance with some embodiments presented herein.

FIG. 7 illustrates an example of optimizing the virtual garbage collection in accordance with some embodiments presented herein. As shown in FIG. 7, custom heap manager 300 may assign (at 702) and/or reassign (at 704 and 706) different memory address ranges from a single memory allocation to different sets of nodes that are processed and/or rendered over three different compute kernel execution cycles or passes.

Custom heap manager 300 may track the last execution cycle or pass that included each node with an assigned memory range from the allocated memory. Custom heap manager 300 may modify operation of the virtual garbage collection so that the memory address ranges associated with nodes that were included with the oldest or most distant execution cycle or pass are reassigned before the memory address ranges associated with nodes that were included with the newest or most recent execution cycle or pass.

As shown in FIG. 7, custom heap manager 300 may receive (at 708) a particular node 701 and/or new set of nodes that is to be processed and/or rendered during a next execution cycle or pass. Custom heap manager 300 may determine that the particular node 701 is not assigned memory from the memory allocation, and may further determine that the memory is full and all address subblocks in the allocation have been assigned to various nodes. Custom heap manager 300 may commence operation of the virtual garbage collector, and may scan the assignments for the most recent execution cycle to identify address range 703 that is assigned to a node that has not been included in the last two execution cycles or passes but that has remained in memory as other subblocks for older nodes were reassigned.

Custom heap manager 300, via operation of the virtual garbage collector, may free (at 710) the subblock for reassignment by removing the association between address range 703 of the subblock and the unused node. Custom heap manager 300 may then assign (at 712) the newly freed subblock address range 703 to the particular node 701.

In some embodiments, particular node 701 may contain less data than is available in the newly freed subblock address range 703. In some such embodiments, custom heap manager 300 may assign (at 712) only the address range or amount of memory that is needed to store the data of particular node 701. Accordingly, some amount of memory from newly freed subblock address range 703 may remain available after assigning the data from particular node 701 to that subblock address range 703. The remaining memory may be used to store data from another node or may remain free. Custom heap manager 300 may merge the remaining free memory with neighboring address ranges that are also free to create a larger subblock of available memory. For instance, in FIG. 7, when the subblock address range associated with "Node 3" is recycled and the subblock address range becomes available, custom heap manager 300 may merge address range from subblock address range 703 that remains free with the subblock address range that becomes available after removing "Node 3".

In some embodiments, custom heap manager 300 and/or the virtual garbage collector may use other criteria to determine which unused nodes to remove from the allocated memory. For instance, custom heap manager 300 may adjust the virtual garbage collection to account for the distance between unused nodes that are assigned to subblocks of the allocated memory, and to prioritize the freeing of the subblocks based on the distance.

Figure 8:
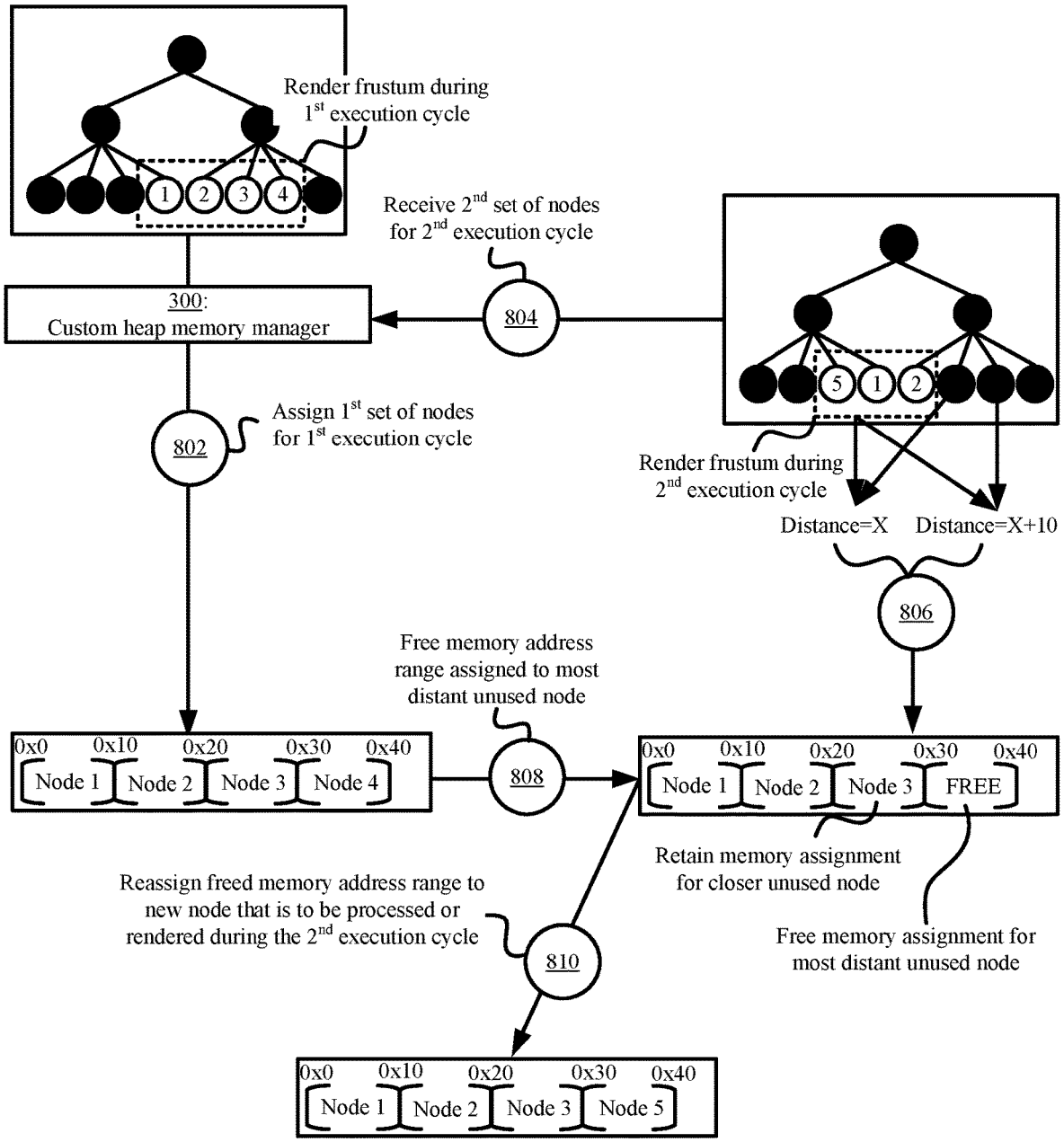
FIG. 8 illustrates an example for modifying operation of the custom heap manager to account for node distances in accordance with some embodiments presented herein.

FIG. 8 illustrates an example for modifying operation of custom heap manager 300 to account for node distances in accordance with some embodiments presented herein. Custom heap manager 300 may assign (at 802) a first set of nodes to the allocated memory during a first compute kernel execution cycle or pass. The first set of nodes may fill the memory.

Custom heap manager 300 may receive (at 804) a second set of nodes to process and/or render during a subsequent second compute kernel execution cycle or pass. Custom heap manager 300 may determine (at 806) the distance between unused nodes that were previously assigned a subblock of the allocated memory and the received set of nodes. In some embodiments, custom heap manager 300 may compare the positional elements of the unused but assigned nodes to the coordinates of the render frustum. Specifically, custom heap manager 300 may locate the unused nodes that are nearest but outside the current render frustum to retain those unused nodes in the allocated memory, and may locate and free (at 808) the assigned memory subblocks from the unused nodes that are furthest from the current render frustum, and are therefore less likely to be moved into the render frustum should the render frustum change. Custom heap manager 300 may then reassign (at 810) and use the freed memory address range to store data of a new node from the current execution cycle or pass.

Figure 9:
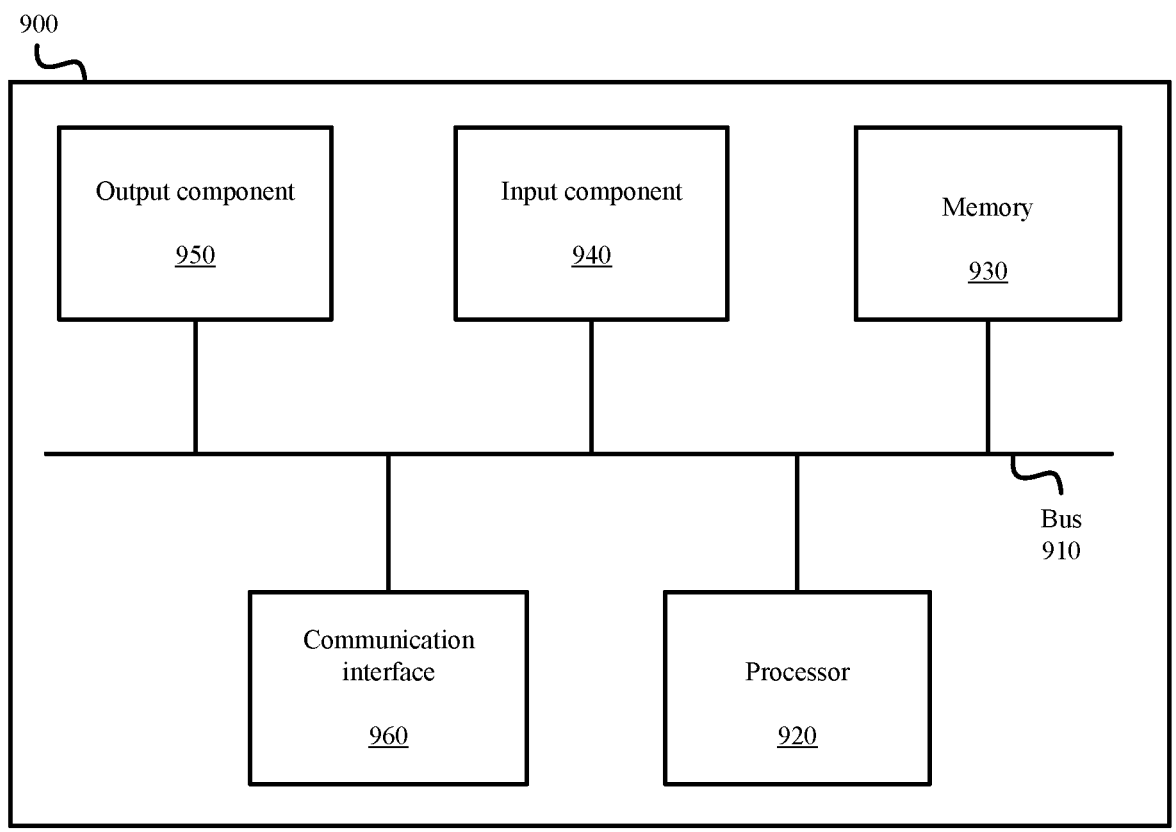
FIG. 9 illustrates example components of one or more devices, according to one or more embodiments described herein.

FIG. 9 is a diagram of example components of device 900. Device 900 may be used to implement one or more of the devices or systems described above (e.g., custom heap manager 300, virtual garbage collector, rendering system, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
  receiving a first set of nodes from a tree-based representation of an image, wherein the tree-based representation comprises a plurality of nodes distributed across different layers of the tree-based representation, wherein a node in a first layer of the tree-based representation comprises more data than a node in a second layer of the tree-based representation for a same subregion of the image, and wherein the first set of nodes comprise one or more of the plurality of nodes distributed across at least the first layer and the second layer of the tree-based representation;

allocating a single block of memory;

assigning each particular node of the first set of nodes to an exclusive address range from two or more different sized address ranges within the single block of memory based on data associated with the each particular node;

uploading the data associated with the each particular node of the first set of nodes to the single block of memory in the exclusive address range assigned to the each particular node; and invoking a compute kernel to process the single block of memory, wherein said invoking the compute kernel comprises:

providing one or more compute kernel instances from a plurality of compute kernel instances access to an address range that is different than the exclusive address range assigned to the each particular node of the first set of nodes, wherein the address range provided to a first compute kernel instance and the address range provided to a second compute kernel instance of the one or more compute kernel instances span a different part of the exclusive address range assigned to a first node of the first set of nodes; and simultaneously processing the address range accessed by each compute kernel instance of the one or more compute kernel instances with a different processing core, wherein said processing comprises processing a first part of the data associated with the first node using a first processing core and a second part of the data associated with the first node using a second processing core based on the address range provided to the first compute kernel instance and the address range provided to the second compute kernel instance spanning a different part of the exclusive address range assigned to the first node.

2. The method of claim 1 further comprising:

receiving a second set of nodes from the plurality of nodes representing a different region of the image than the first set of nodes;

retaining the exclusive address range assigned to a first subset of nodes in the first set of nodes that are also in the second set of nodes during an execution cycle associated with the second set of nodes; and assigning a different exclusive address range within the single block of memory that is free to each node of a second subset of nodes from the second set of nodes that is not in the first set of nodes without allocating an additional memory or changing the single block of memory.

3. The method of claim 2 further comprising:

retaining the data of each node from the first subset of nodes in the single block of memory during the execution cycle associated with the second set of nodes;

uploading data of each node from the second subset of nodes to the single block of memory in the different exclusive address range assigned to each node from the second subset of nodes during the execution cycle associated with the second set of nodes; and processing the single block of memory during the execution cycle associated with the second set of nodes with each compute kernel instance of the plurality of compute kernel instances processing an equal sized address range, wherein one or more of the equal sized address ranges are different than the exclusive address range assigned to each node of the second set of nodes.

4. The method of claim 1 further comprising:

receiving a second set of nodes from the plurality of nodes representing a different region of the image than the first set of nodes;

determining a first subset of nodes from the first set of nodes that are not part of the second set of nodes; and marking the exclusive address range assigned to each node of the first subset of nodes as available for reassignment without modifying the data that is uploaded to the single block of memory in the exclusive address range assigned to the each node of the first subset of nodes.

5. The method of claim 4 further comprising:

assigning data associated with each node of the second set of nodes that is not part of the first set of nodes to the exclusive address range previously assigned to one of the first subset of nodes and that is marked as available for reassignment; and overwriting the single block of memory at the exclusive address range assigned to the each node of the second set of nodes with the data associated with the each node of the second set of nodes.

6. The method of claim 1, wherein the invoking the compute kernel comprises:

rendering an image based on the data associated with the each particular node of the first set of nodes that is uploaded to the single block of memory.

7. The method of claim 1, wherein the plurality of nodes represent a plurality of data points of a three-dimensional ("3D") environment at different levels of detail.

8. The method of claim 1 further comprising:

tracking the exclusive address range assigned to the each particular node of the first set of nodes, wherein said tracking comprises one of:

adding the exclusive address range that is assigned to a node to one or more elements storing data of the node, or generating a table comprising an identifier for the each particular node of the first set of nodes and the exclusive address range that is assigned to the each particular node of the first set of nodes.

9. The method of claim 1 further comprising:

receiving a start address and an end address for the single block of memory in response to the allocating of the single block of memory, wherein the exclusive address range assigned to the each particular node of the first set of nodes comprises different continuous non-overlapping addresses between the start address and the end address.

10. The method of claim 1, wherein the single block of memory comprises an allocation of a memory from a graphics processing unit ("GPU"), and wherein each compute kernel instance of the plurality of compute kernel instances executes on the different processing core of the GPU.

11. The method of claim 1, wherein the uploading the data comprises:

transferring the data associated with the each particular node of the first set of nodes from a first memory or a first storage device to a second memory, wherein the first memory comprises a system memory of a computing device, and wherein the second memory comprises a memory of a GPU that is connected to the computing device.

12. The method of claim 1, wherein the allocating the single block of memory comprises:
computing a maximum amount of memory associated with rendering different images or frames from different sets of the plurality of nodes; and
issuing a memory allocation call based on the maximum amount of memory.

13. The method of claim 1 further comprising:
receiving a second set of nodes from the plurality of nodes representing a different region of the image than the first set of nodes;
determining a render frustum associated with the second set of nodes;
determining a distance between the render frustum and a subset of nodes from the first set of nodes that are not part of the second set of nodes; and
removing an assignment of the exclusive address range assigned to a first node of the subset of nodes while retaining an assignment of the exclusive address range to a second node of the subset of nodes in response to the distance between the render frustum and the first node of the subset of nodes being greater than the distance between the render frustum and the second node of the subset of nodes.

14. A non-transitory computer-readable medium storing a plurality of processor-executable instructions that, when executed by one or more processors, cause a computing system to perform operations comprising:
receive a first set of nodes from a tree-based representation of an image, wherein the tree-based representation comprises a plurality of nodes distributed across different layers of the tree-based representation, wherein a node in a first layer of the tree-based representation comprises more data than a node in a second layer of the tree-based representation for a same subregion of the image, and wherein the first set of nodes comprise one or more of the plurality of nodes distributed across at least the first layer and the second layer of the tree-based representation;
allocate a single block of memory;
assign each particular node of the first set of nodes to an exclusive address range from two or more different sized address ranges within the single block of memory based on data associated with the each particular node;
upload the data associated with the each particular node of the first set of nodes to the single block of memory in the exclusive address range assigned to the each particular node; and
invoke a compute kernel to process the single block of memory, wherein said invoking the compute kernel comprises:
providing one or more compute kernel instances from a plurality of compute kernel instances access to an address range that is different than the exclusive address range assigned to the each particular node of the first set of nodes, wherein the address range provided to a first compute kernel instance and the address range provided to a second compute kernel instance of the one or more compute kernel instances span a different part of the exclusive address range assigned to a first node of the first set of nodes; and
simultaneously processing the address range accessed by each compute kernel instance of the one or more compute kernel instances with a different processing core, wherein said processing comprises processing a first part of the data associated with the first node using a first processing core and a second part of the data associated with the first node using a second processing core based on the address range provided to the first compute kernel instance and the address range provided to the second compute kernel instance spanning a different part of the exclusive address range assigned to the first node.

15. A system comprising:
a memory;
a compute kernel with access to the memory; and
one or more processors configured to:
receive a first set of nodes from a tree-based representation of an image, wherein the tree-based representation comprises a plurality of nodes distributed across different layers of the tree-based representation, wherein a node in a first layer of the tree-based representation comprises more data than a node in a second layer of the tree-based representation for a same subregion of the image, and wherein the first set of nodes comprise one or more of the plurality of nodes distributed across at least the first layer and the second layer of the tree-based representation;
allocate a single block of memory from the memory;
assign each particular node of the first set of nodes to an exclusive address range from two or more different sized address ranges within the single block of memory based on data associated with the each particular node;
upload the data associated with the each particular node of the first set of nodes to the single block of memory in the exclusive address range assigned to the each particular node; and
invoke the compute kernel to process the block of memory, wherein said invoking the compute kernel comprises:
providing one or more compute kernel instances from a plurality of compute kernel instances access to an address range that is different than the exclusive address range assigned to the each particular node of the first set of nodes, wherein the address range provided to a first compute kernel instance and the address range provided to a second compute kernel instance of the one or more compute kernel instances span a different part of the exclusive address range assigned to a first node of the first set of nodes; and
simultaneously processing the address range accessed by each compute kernel instance of the one or more compute kernel instances with a different processing core, wherein said processing comprises processing a first part of the data associated with the first node using a first processing core and a second part of the data associated with the first node using a second processing core based on the address range provided to the first compute kernel instance and the address range provided to the second compute kernel instance spanning a different part of the exclusive address range assigned to the first node.

16. The system of claim 15, wherein the one or more processors are further configured to:
receive a second set of nodes from the plurality of nodes representing a different region of the image than the first set of nodes;
retain the exclusive address range assigned to a first subset of nodes in the first set of nodes that are also in the second set of nodes during an execution cycle associated with the second set of nodes; and assign a different exclusive address range within the single block of memory that is free to each node of a second subset of nodes from the second set of nodes that is not in the first set of nodes without allocating an additional memory or changing the single block of memory.

17. The system of claim 16, wherein the one or more processors are further configured to:
retain the data of each node from the first subset of nodes in the single block of memory during the execution cycle associated with the second set of nodes;
upload data of each node from the second subset of nodes to the single block of memory in the different exclusive address range assigned to each node from the second subset of nodes during the execution cycle associated with the second set of nodes; and
process the single block of memory during the execution cycle associated with the second set of nodes with each compute kernel instance of the plurality of compute kernel instances processing an equal sized address range, wherein one or more of the equal sized address ranges are different than the exclusive address range assigned to each node of the second set of nodes.

18. The system of claim 15, wherein the one or more processors are further configured to:
receive a second set of nodes from the plurality of nodes representing a different region of the image than the first set of nodes;
determine a first subset of nodes from the first set of nodes that are not part of the second set of nodes; and
mark the exclusive address range assigned to each node of the first subset of nodes as available for reassignment without modifying the data that is uploaded to the single block of memory in the exclusive address range assigned to the each node of the first subset of nodes.

19. The system of claim 18, wherein the one or more processors are further configured to:
assign data associated with each node of the second set of nodes that is not part of the first set of nodes to the exclusive address range previously assigned to one of the first subset of nodes and that is marked as available for reassignment; and
overwrite the single block of memory at the exclusive address range assigned to the each node of the second set of nodes with the data associated with the each node of the second set of nodes.

20. The system of claim 15, wherein the one or more processors are further configured to:
receive a second set of nodes from the plurality of nodes representing a different region of the image than the first set of nodes;
determine a render frustum associated with the second set of nodes;
determine a distance between the render frustum and a subset of nodes from the first set of nodes that are not part of the second set of nodes; and
remove an assignment of the exclusive address range assigned to a first node of the subset of nodes while retaining an assignment of the exclusive address range to a second node of the subset of nodes in response to the distance between the render frustum and the first node of the subset of nodes being greater than the distance between the render frustum and the second node of the subset of nodes.

* * * * *